United States Patent [19]

Shinkai et al.

[11] Patent Number: 5,386,575
[45] Date of Patent: Jan. 31, 1995

[54] ELECTRONIC APPARATUS AND METHOD FOR DETECTING THE VALUE OF VOLTAGE SUPPLIED BY A POWER SOURCE DURING THE OPERATION OF AN INPUT AND/OR OUTPUT DEVICE ON THE BASIS OF TEST DATA SENT TO THE INPUT AND/OR OUTPUT DEVICE

[75] Inventors: Michinori Shinkai, Tokyo; Katsuhiko Sakaguchi, Kawasaki, both of Japan

[73] Assignee: Canon Kabushiki Kaisha, Tokyo, Japan

[21] Appl. No.: 871,998

[22] Filed: Apr. 22, 1992

[30] Foreign Application Priority Data

Jun. 10, 1991 [JP] Japan .................. 3-137321

[51] Int. Cl.⁶ .............................................. G06F 1/28
[52] U.S. Cl. .................................. 395/750; 395/575; 371/20.4; 340/636; 324/433
[58] Field of Search .............. 395/750, 575; 364/707, 364/273.1, DIG. 1, 948.4, DIG. 2, 483; 371/66, 12, 14, 13, 20.4, 21.4; 340/853.2, 870.39, 516, 636, 660, 661; 324/426, 429, 433, 435

[56] References Cited

U.S. PATENT DOCUMENTS

| | | | |
|---|---|---|---|
| 4,551,841 | 11/1985 | Fujita et al. | 395/750 |
| 4,553,081 | 11/1985 | Koenck | 320/43 |
| 4,667,289 | 5/1987 | Yoshida et al. | 395/750 |
| 4,672,573 | 6/1987 | Shonaka | 395/575 |
| 4,707,795 | 11/1987 | Alber et al. | 364/550 |
| 4,766,567 | 8/1988 | Kato | 395/750 |
| 4,843,592 | 6/1989 | Tsuaki et al. | 395/750 |
| 4,907,183 | 3/1990 | Tanaka | 364/707 |
| 4,984,185 | 1/1991 | Saito | 364/707 |
| 5,130,659 | 7/1992 | Sloan | 324/435 |
| 5,218,705 | 6/1993 | DeLuca et al. | 395/750 |

FOREIGN PATENT DOCUMENTS 3119438 2/1982 Germany .
9013079 11/1990 WIPO .

*Primary Examiner*—Jack B. Harvey
*Assistant Examiner*—Glenn A. Auve
*Attorney, Agent, or Firm*—Fitzpatrick, Cella, Harper & Scinto

[57] ABSTRACT

An electronic apparatus and method includes a memory for storing data to be sent to an input and/or output device, a transmitter for transmitting data stored in the memory, a power source for supplying power to the input and/or output device, a device for outputting predetermined test data to the input and/or output device, a detector for detecting the value of the voltage supplied by the power source during operation of the input and/or output device on the basis of the predetermined test data, and a determining device for determining whether the voltage detected by the detector is higher than a predetermined voltage. The data stored in the memory is sent to the input and/or output device when the voltage detected by the detector is determined to be higher than the predetermined voltage.

15 Claims, 3 Drawing Sheets

FIG. I

ELECTRONIC APPARATUS AND METHOD FOR DETECTING THE VALUE OF VOLTAGE SUPPLIED BY A POWER SOURCE DURING THE OPERATION OF AN INPUT AND/OR OUTPUT DEVICE ON THE BASIS OF TEST DATA SENT TO THE INPUT AND/OR OUTPUT DEVICE

BACKGROUND OF THE INVENTION

1. Field of the Invention

The present invention relates to an electronic apparatus, and particularly to an electronic apparatus for data input/output processing to a predetermined input/output device.

2. Description of the Prior Art

Generally known electronic apparatuses such as personal computers, word processors and the like include electronic apparatuses which receive data from and transmit data to external printers and other electronic apparatuses. Such electronic apparatuses having the input/output function include various types of apparatuses such as desk-top computers, lap-top computers, hand held computers and the like. Lap-top computers and hand held types of apparatuses are frequently driven by a battery or supplied with electricity using DC electric power, such as an AC adapter, externally attached or the like, because importance is attached to portability.

It is known that the above-described electronic apparatus have a printer interface or a communication interface such as RS232C, or the like, which is provided on the outside thereof, not in the apparatus body, in order to decrease the size and weight of the body or decrease the cost.

In such a configuration, the interface is frequently supplied with electricity from the body side, like the case in which an interface is contained in the apparatus. This is designed for decreasing the size and weight of a communication interface of the like or decreasing the cost.

As is generally known, a central processing unit, CPU and a memory which constitute a control section of the electronic apparatus cannot be normally operated until a stable supply voltage of at least a predetermined value is supplied thereto. However, the above-described conventional apparatus can become inoperative during communication due to a combination of a drop in the supply voltage caused by the operation of the body and a voltage drop caused by the operation of the communication interface externally attached to the body. In this case, there is also the danger of destroying important user data stored in the memory.

An interface such as RS232C, a centronics port, or the like generally conducts a relatively large driving current and thus there is a higher probability that the above problems will be produced than that in the case where the body only is driven.

Although the case where a communication interface is externally attached is described above, the case where the interface is contained in the apparatus body also has the same problem that the apparatus becomes inoperative during communication.

SUMMARY OF THE INVENTION.

It is an object of the present invention to solve the problems of the prior art.

It is still another object of the present invention to provide an electronic apparatus which does not become inoperative due to a voltage drop during inputting or outputting of data.

According to one aspect, the invention which achieves these objectives relates to an electronic apparatus comprising means for inputting and/or outputting data to or from a predetermined input and/or output device, detection means for detecting the minimum main supply voltage needed for the apparatus during data input and/or output to or from the input and/or output device, and control means for comparing the minimum main supply voltage detected by the detection means during the inputting and/or outputting of data to or from the input and/or output device with a predetermined reference voltage so that data input and/or output processing of the inputting and/or outputting means is restricted when the minimum main supply voltage is lower than the reference voltage. The detection means detects the minimum main supply voltage during the inputting and/or outputting of test data into or out of the predetermined input and/or output device.

According to another aspect, the present invention which achieves these objectives relates to an electronic apparatus comprising detection means for detecting a voltage of a power source, a first storage region for storing information representing the value of the voltage detected by the detection means when a predetermined input and/or output device performs no input and/or output processing, data output means for outputting test data to the predetermined input and/or output device, a second storage region for storing information representing the value of the minimum voltage detected by the detection means during processing of the test data by the predetermined input and/or output device output from the data output means, and control means for restricting data output from the predetermined input and/or output device when one of the values stored in the first and second storage regions is smaller than a predetermined value. In addition, the control means can restrict data output from the predetermined input and/or output device when the smaller of the values stored in the first and second storage regions is smaller than the predetermined value. The apparatus can further comprise display means for displaying at least characters so that when the data output is restricted by the control means, the display means displays a predetermined message.

DETAILED DESCRIPTION OF THE PREFERRED EMBODIMENTS

Figure 1:
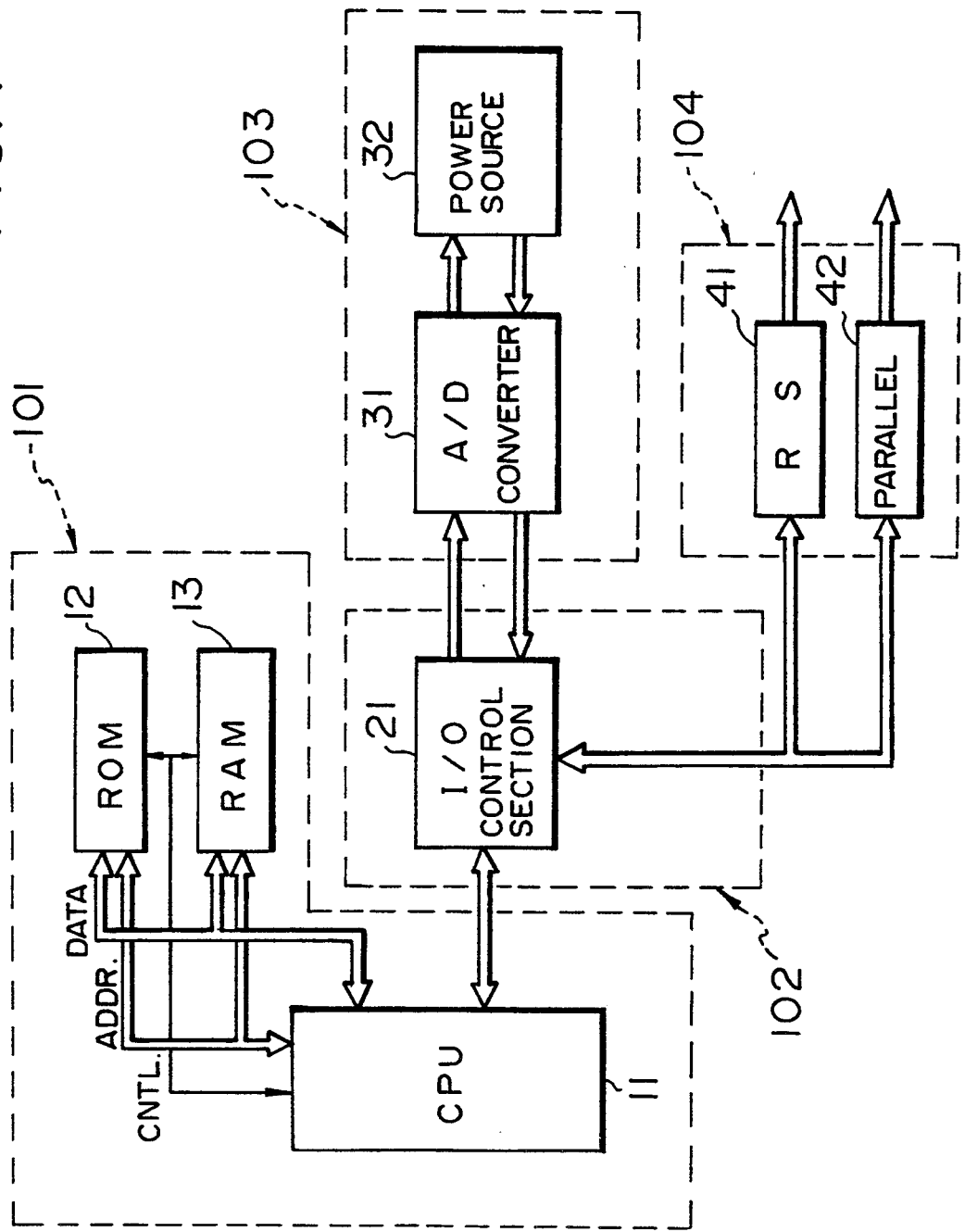
FIG. 1 is a block diagram of an electronic apparatus to which the present invention is applied.

The present invention is described in detail below with reference to the embodiment shown in the drawings.

FIG. 1 shows the configuration of a control section common to electronic apparatuses such as a personal computer, a word processor and the like, all of which employ the present invention. In the drawing, reference numeral 101 denotes a control system contained in the apparatus body and having a central processing unit, CPU, 11 comprising a microprocessor, and a read only memory, ROM, 12 and a random access memory, RAM, 13 both of which are connected to the CPU 11 by an address bus and a data bus.

The RAM 13 is used as a work area for the CPU 11 for storing user data. The ROM 12 is used for storing the control program of the CPU 11 described below. An input/output control section 21 is connected to the CPU 11. The input/output control section 21 comprises a control circuit for controlling input/output to an external circuit 104 comprising a centronics interface or parallel port 42 and an RS232C interface 41, which are contained in the apparatus body or are externally attached thereto.

The power of the apparatus is supplied from a power source 32 of a power source section 103. The power source 32 comprises, for example, a battery or the like, for supplying power to the control section 101 of the body and for supplying power to the external circuit 104 comprising the external interfaces 41, 42 when the external circuit 104 is connected thereto.

The operation of the above configuration is described below. The CPU 11 has an internal timer so that an interrupt routine is executed at predetermined time intervals on the basis of the timer control. In this embodiment, when the output voltage of the power source 32 is detected through an anolog-to-digital, A/D converter 31 and the input/output control section 21, detection processing is performed at predetermined intervals according to a timer interrupt procedure.

In this embodiment, in order to prevent the apparatus from becoming inoperative due to a voltage drop during input/output to an external apparatus through the external circuit 104, when data is input to and output from the external circuit 104, test data (which can be specific data, actual data, or calibration data) is output before actual data input and output so that a supply voltage during input and output of data to the external circuit 104 is detected for making a decision as to whether or not communication processing can be performed.

Figure 2:
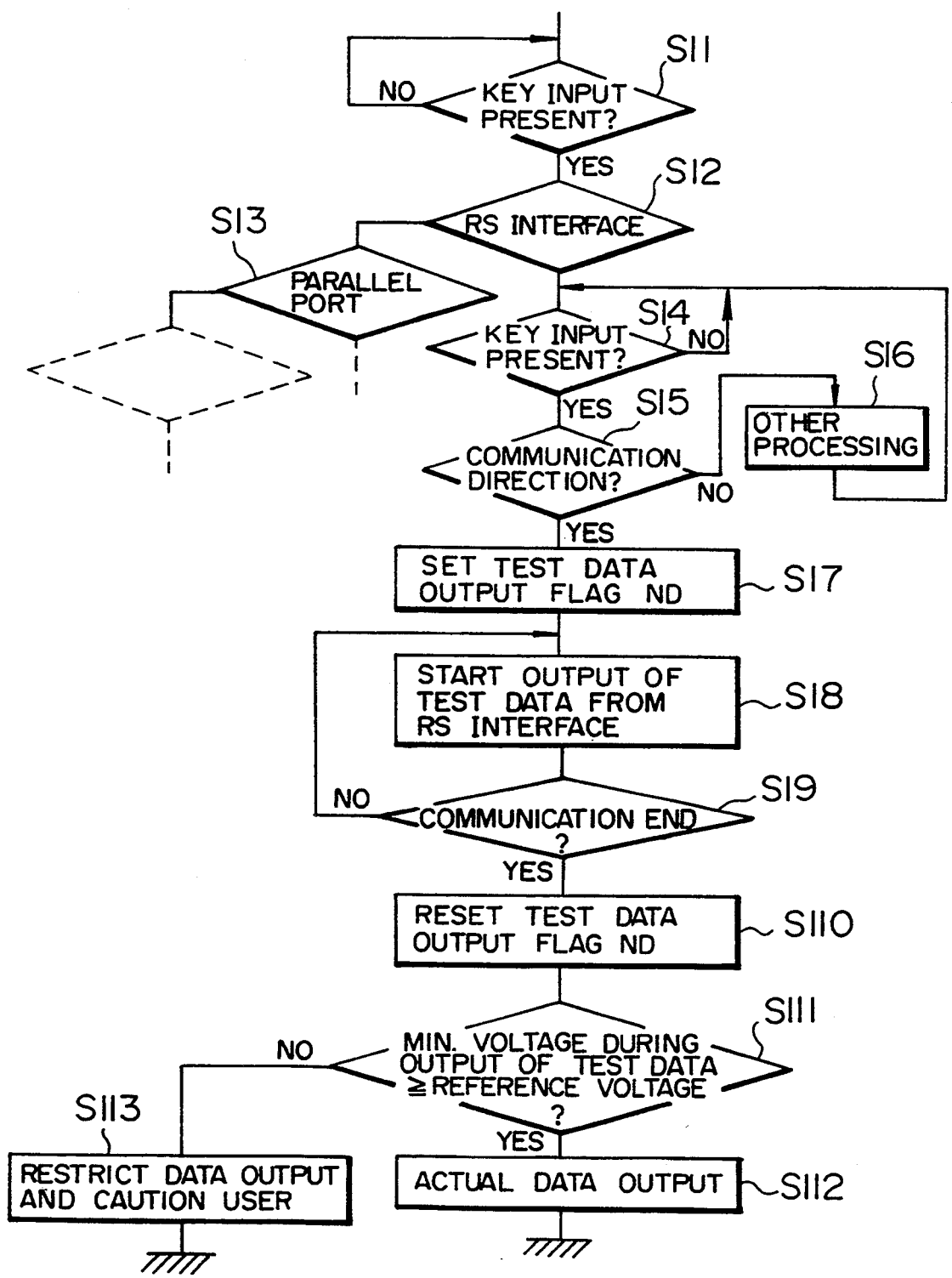
FIG. 2 is a flow chart showing the procedure of communication control of the apparatus shown in FIG. 1.
Figure 3:
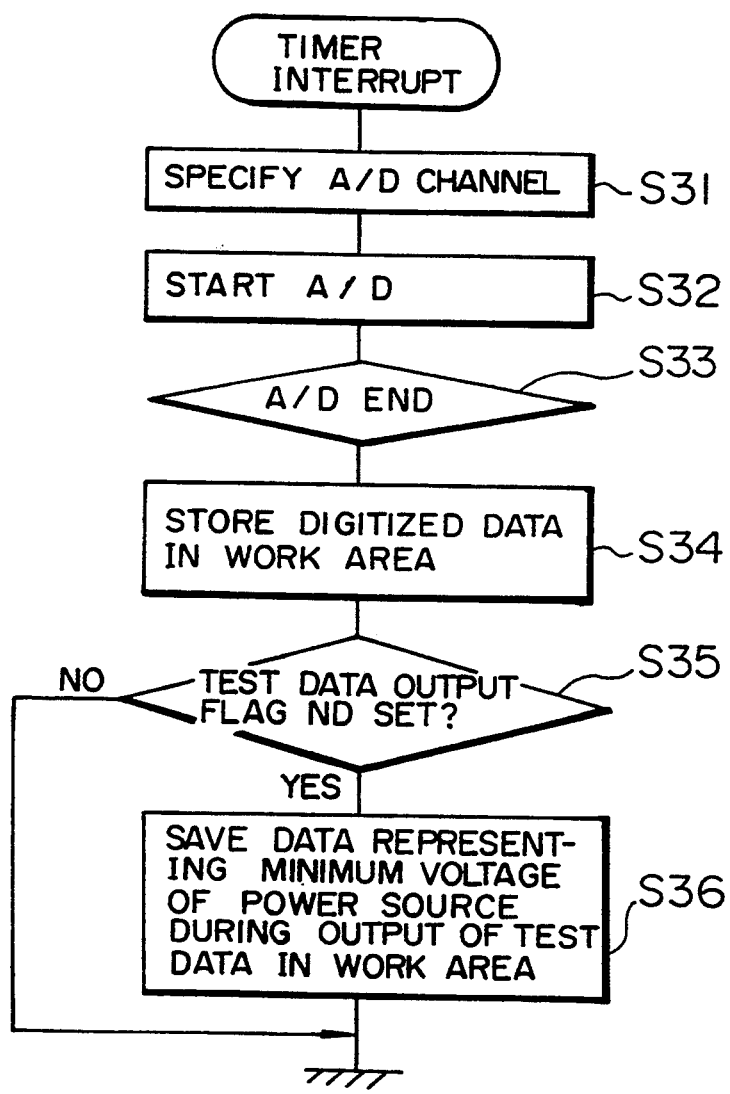
FIG. 3 is a flow chart showing the timer interrupt routine of the apparatus shown in FIG. 1.

FIG. 2 shows the control of input/output to the external circuit 104. FIG. 3 shows the interrupt routine which is executed according to a timer interrupt procedure at predetermined intervals (for example, several seconds to ten-odd seconds). These program areas are stored as control programs for the CPU 11 in the ROM 12.

The interrupt routine shown in FIG. 3 is described below. It is controlled by the CPU 11. Steps S31 to S34 show the process of reading the output voltage of the power source 32 through the A/D converter 31. The A/D converter 31 has a plurality of A/D channels. In Step S31, the channel to which the power source 32 is assigned by the CPU 11 is specified by the CPU 11.

In Steps S32 and S33, the output voltage of the power source 32 is read through the A/D converter 31 when no signal is transmitted from the section 21 to the external circuit 104. The A/D converter outputs digitized data representing the output voltage of the power source 32. This digitized data is transmitted to the input/output control section 21, and the CPU 11 stores the digitized data in the work area of the RAM 13 in Step S34.

In Step S35, a decision is made by the CPU 11 as to whether or not a flag ND, indicating whether or not test data is presently output, is set. The flag ND is set during the output of the test data to the external circuit 104. If the flag ND is set, the digitized data representing minimum supply voltage of the power source 32 during the time the flag is set is stored in a specific region of the work area in Step S36.

Data representing the minimum value is stored by comparing the value read in Step S34 with data representing a value stored in an area of the RAM 13, of one or more bytes, for the minimum voltage of the power source 32 during the output of the test data to the external circuit 104 read through the A/D converter 31. If the newly-read value of the voltage of the power source 32 read during the output of the test data is smaller than the previously stored value in Step S34, the newly-read value is stored, and if the stored value in Step S34 is smaller than the read value read during the output of test data, the area of the RAM 13 in which the previously-stored value in Step S34 is stored is left as it was without being rewritten. In an initialization step, the data representing maximum value output from the A/D converter is previously stored in this area.

In Step S11 shown in FIG. 2, a key input using a key board (not shown) is detected by the CPU 11. This is because input and output to the external circuit 104 are generally started by input from the key board. If a key input is detected in Steps S12, S13, a decision is made by the CPU 11 as to whether or not input/output to the RS232C interface 41 or the parallel port 42 is directed by key input. If a key input is not detected in Step S11, the procedure returns to Step S11 to again determine whether a key input is detected.

When it is decided by the CPU 11 in Step S12 that the RS232C interface 41 is selected, predetermined operations for specifying a communication speed, a parity/stop bit, and so on, are performed in Steps S14 to S16. When a key input is present in Step S14 and when communication start is directed in Step S15, the dummy operation of outputting the test data to the RS232C interface 41 is performed in Steps S17 to S111 before actual data is actually output in Step S112. During the dummy operation, the process of deciding the minimum supply voltage stored according to the procedure shown in FIG. 3 is performed. If a key input is not present at Step S14, the procedure returns to Step S14 to again determine if a key input is present, If a communication start is not directed in Step S15, the procedure goes to Step S16 to perform other processing operations.

In Step S17, the test data output flag ND is set, and in Step S18, the dummy test data is output to the RS232C interface 41 through the input/output control section 21. In this operation, data of about 100 bytes is output to the RS232C interface 41. The test data preferably has no effect on the RS232C interface 41 or an external apparatus connected therethrough. For example, NULL ($\phi$) data is preferable. It is also thought that it is preferable to output a data pattern which increases, to the maximum value, the current consumed by an external circuit, such as the RS232C interface 41 or the like.

In Step S19, a decision is made by the CPU 11 as to whether or not the test data is completely transmitted. If the output is completed, the flag ND is reset in Step S110. If not, the procedure returns to Step S17.

In Step S111, data representing the minimum supply voltage during output of the test data, which is stored in the work area of the RAM 13 according to the procedure shown in FIG. 3, is compared with data representing a predetermined reference voltage. The reference voltage is the supply voltage value which enables the satisfactory operation of each of the necessary sections of the apparatus.

If it is decided by the CPU 11 in Step Sill that the minimum supply voltage stored in the predetermined area of the RAM 13 is greater than the reference voltage, actual data is output to the RS232C interface in Step S112.

Figure 4:
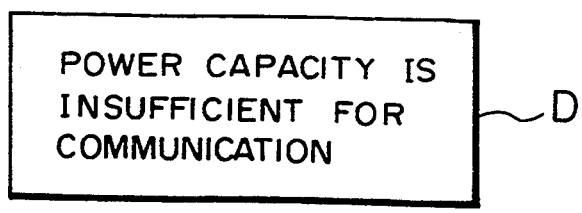
FIG. 4 is an explanatory view showing an example of display output of the apparatus shown in FIG. 1.

On the other hand, if it is decided by the CPU 11 in Step S111 that the minimum supply voltage is smaller than the reference voltage, in Step S113, data output is inhibited, and the warning shown in FIG. 4 is displayed on a display or the like. FIG. 4 shows the message displayed on the display D shown in FIG. 1 in Step S113. The message states that the current capacity is insufficient for communication.

In the above-described configuration, the minimum supply voltage during the test data output to the external circuit 104 is detected and compared with the predetermined reference voltage so that actual communication is simulated, and a decision is made by measuring the supply voltage during the communication as to whether or not the apparatus can be operated. It is thus possible to prevent the occurrence of the accident that the apparatus becomes inoperative, with the consequent destruction of data.

In the above embodiment, the minimum supply voltage is measured by outputting dummy test data, and a protocol is used for transmitting the header portion before the substantial data portion is transmitted during the output of actual data. However, when a failure in transmission of the header portion has no effect on the entire communication processing operation, the minimum supply voltage may be measured by, for example, transmitting the header portion, not by outputting the dummy data.

In addition, it is a matter of course that not only data output but also data input can be controlled in the same way as that described above. The input/output to the parallel port 42 can also be controlled by the same method as that described above.

As described above, the present invention comprises the input/output means for data input/output processing to a predetermined input/output device, the detection means for detecting the minimum main supply voltage of the apparatus during the data input/output to the input/output device, and the control means for comparing the minimum main supply voltage detected by the detection means during the data input/output to the input/output device with the predetermined reference voltage so that data input/output processing of the input/output means is restricted when the minimum main supply voltage is lower than the reference voltage. The invention thus can provide an excellent electronic apparatus which is capable of restricting data input/output processing in response to a voltage drop during data input/output and which is capable of preventing the apparatus from becoming inoperative due to the voltage drop during data input/output and thus preventing the occurrence of the accident that data is destroyed.

The individual components represented by the blocks shown in FIG. 1 are well-known in the electronic apparatus art and their specific construction and operation is not critical to the invention or the best mode for carrying out the invention. Moreover, the operations illustrated in FIGS. 2 and 3 can be easily programmed into well-known central processing units by persons of ordinary skill in the art and since such programming per se is not part of the invention, no further description is deemed necessary.

What is claimed is:

1. An electronic apparatus comprising:
    storage means for storing data to be sent to an input and/or output device;
    sending means for sending out the data stored in said storage means to the input and/or output device;
    source means for supplying power to the input and/or output device;
    output means for outputting predetermined test data to the input and/or output device;
    detecting means for detecting a voltage value of voltage supplied by said source means during the receiving of the predetermined test data by the input and/or output device;
    determining means for determining whether a voltage detected by said detecting means is higher than a predetermined voltage,
    wherein the data stored in said storage means is sent to the input and/or output device when the voltage detected by said detecting means is determined to be higher than the predetermined voltage; and
    restricting means for restricting transmission of the data stored in said storage means to the input and/or output device when the voltage detected by said detecting means is determined to be lower than the predetermined voltage.

2. An electronic apparatus according to claim 1, further comprising data memory means for storing a minimum voltage detected by said detecting means,
    wherein said determining means determines whether the minimum voltage stored in said data memory means is higher than a predetermined voltage.

3. An electronic apparatus according to claim 2, further comprising display-control means for displaying a message when the voltage detected by said detecting means is determined to be lower than the predetermined voltage.

4. An electronic apparatus according to claim 1, further comprising display control means for displaying a message when the voltage detected by said detecting means is determined to be lower than the predetermined voltage.

5. An electronic apparatus comprising:
    storage means for storing data to be sent to an input and/or output device;
    sending means for sending out the data stored in said storage means to the input and/or output device;
    source means for supplying power to the input and/or output device;
    output means for outputting predetermined test data to the input and/or output device;
    detecting means for detecting a voltage value of voltage supplied by said source means during the receiving of the predetermined test data by the input and/or output device;
    determining means for determining whether a voltage detected by said detecting means is higher than a predetermined voltage,
    wherein the data stored in said storage means is sent to the input and/or output device when the voltage detected by said detecting means is determined to be higher than the predetermined voltage; and
    display control means for displaying a message when the voltage detected by said detecting means is determined to be lower than the predetermined voltage.

6. An electronic apparatus comprising:

storage means for storing data to be sent to an input and/or output device;

test data sending means for sending out predetermined test data to the input and/or output device before sending the data stored in said storage means;

detecting means for detecting a voltage value of voltage supplied by a power source during the sending out of test data from the test data sending means to the input and/or output device;

transmission means for transmitting data stored in said storage means to the input and/or output means on the basis of a result of detection by said detecting means; and restricting means for restricting transmission of the data stored in said storage means to the input and/or output device when the voltage detected by said detecting means is determined to be lower than the predetermined voltage.

7. An electronic apparatus according to claim 6, further comprising data memory means for storing a minimum voltage detected by said detecting means, wherein said transmission means sends the data stored in said storage means on the basis of the minimum voltage stored in said data memory means.

8. An electronic apparatus according to claim 7, further comprising display control means for displaying a message when the voltage detected by said detecting means is lower than a predetermined voltage.

9. An electronic apparatus according to claim 6, further comprising display control means for displaying a message when the voltage detected by said detecting means is lower than a predetermined voltage.

10. An electronic apparatus comprising:

storage means for storing data to be sent to an input and/or output device;

test data sending means for sending out predetermined test data to the input and/or output device before sending the data stored in said storage means;

detecting means for detecting a voltage value of voltage supplied by a power source during the sending out of test data from the test data sending means to the input and/or output device;

transmission means for transmitting data stored in said storage means to the input and/or output means on the basis of a result of detection by said detecting means; and display control means for displaying a message when the voltage detected by said detecting means is lower than a predetermined voltage.

11. An electronic apparatus comprising:

storage means for storing transmission data comprising a header portion and a main portion;

detecting means for detecting a voltage of a power source; and comparison means for comparing the voltage detected by said detecting means and a predetermined voltage, wherein said comparison means compares the voltage of the power source during transmission of the header portion of the transmission data by transmission means, and wherein the transmission means transmits the main portion of the transmission data on the basis of the result of the comparison.

12. An electronic apparatus according to claim 11, further comprising display control means for displaying a message when the voltage detected by said detecting means is lower than the predetermined voltage.

13. An electronic apparatus according to claim 11, further comprising data memory means for storing a minimum voltage detected by said detecting means, wherein the data transmission means sends the data stored in said storage means on the basis of the minimum voltage stored in said data memory means.

14. An data transfer method comprising the steps of:

before sending data stored in storage means to an input and/or output device, sending test data to the input and/or output device;

detecting a value of voltage supplied by a power source during the operation of the input and/or output device and during the sending of test data to the input and/or output device;

sending data stored in the storage means to the input and/or output device on the basis of the detected voltage detected in said detecting step; and restricting means for restricting transmission of the data stored in said storage means to the input and/or output device when the voltage detected by said detecting means is determined to be lower than the predetermined voltage.

15. A method comprising the steps of:

storing data to be sent to an input and/or output device;

supplying power to the input and/or output device;

outputting predetermined test data to the input and/or output device;

detecting a voltage value of voltage supplied by said supplying step during the receiving of the predetermined test data by the input and/or output device;

determining whether a voltage detected in said detecting step is higher than a predetermined voltage;

sending the data stored in said storing step to the input and/or output device when the voltage detected in said detecting step is determined to be higher than the predetermined voltage; and displaying a message when the voltage detected in said detecting step is determined to be lower than the predetermined voltage.

* * * * *

UNITED STATES PATENT AND TRADEMARK OFFICE
CERTIFICATE OF CORRECTION

PATENT NO. : 5,386,575
DATED : January 31, 1995
INVENTOR(S) : Michinori shinkai, et. al.

It is certified that error appears in the above-indentified patent and that said Letters Patent is hereby corrected as shown below:

Column 4, line 45, "present, " should read --present.--
Column 5, line 4, "Step Sill" should read --step Slll--.
Column 7, lines 13-14 "output means" should read --output device--.
        lines 49-50 "output means" should read --output device --.
Column 8, line 24, "An" should read --A--.

Signed and Sealed this

Ninth Day of May, 1995

Attest:

BRUCE LEHMAN

Attesting Officer      Commissioner of Patents and Trademarks